I. BEST.
HIGH SPEED TWIST DRILL.
APPLICATION FILED SEPT. 28, 1912.
1,174,806.
Patented Mar. 7, 1916.
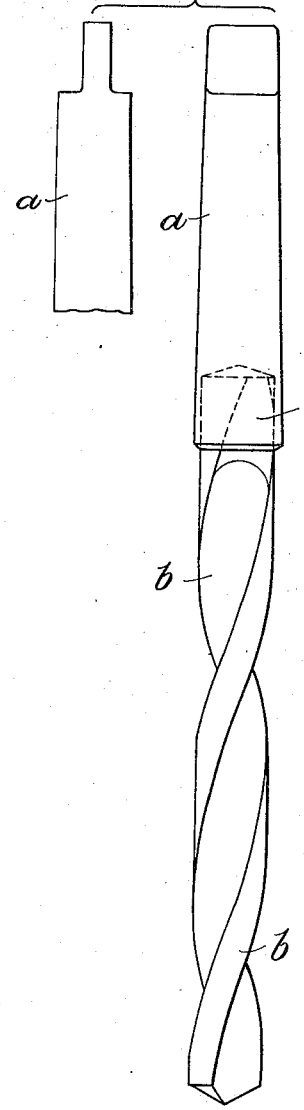
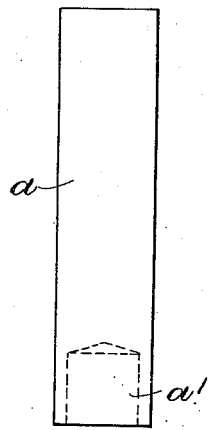
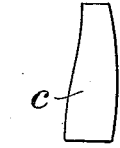
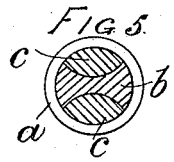
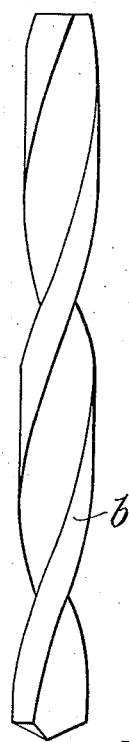
Witnesses—
Inventor—
Isaac Best.
by his Attorneys—

UNITED STATES PATENT OFFICE.

ISAAC BEST, OF MANCHESTER, ENGLAND.

HIGH-SPEED TWIST-DRILL.

1,174,806.  Specification of Letters Patent.  Patented Mar. 7, 1916.

Application filed September 28, 1912. Serial No. 722,362.

*To all whom it may concern:*

Be it known that I, ISAAC BEST, a subject of the King of Great Britain and Ireland, residing at Culcheth Lane Tool Works, Newton Heath, Manchester, county of Lancaster, England, engineers'-tool maker, have invented Improvements in High Speed Twist-Drills, of which the following is a specification.

My invention relates to twist drills, reamers, and similar metal cutting tools, and has special reference to drills or like tools of the kind wherein the drill proper or cutting part is made separate from and afterward connected to the shank or holding part, which latter may be made of a less expensive grade or quality of steel than the cutting part or drill proper.

In drills or tools of a composite character, various means have been proposed for securing the drill proper or cutting part to the shank or holding part, and my invention has for its object to provide an improved drill or like tool in which the drill proper or cutting part is secured to the shank or holding part in a simple and efficient manner.

My invention is more fully described hereinafter, reference being had to the accompanying drawings, in which:

Figure 1, is an elevation of a finished twist drill embodying my improvements; Fig. 2, is an elevation of the shank or holding part of the drill before finishing; Fig. 3, is an elevation of the drill proper or cutting part; Fig. 4, is a view of a locking key or wedge; Fig. 5, is an inverted plan view, partly in section, showing the drill secured to the shank, and Fig. 6, is a cross sectional view of the drill.

In the drawings, $a$ represents the shank or holding part, and $b$ the drill proper or cutting part, which is made separately from the shank $a$. Such drill or cutting part is made from high-speed steel of the usual section as shown in Fig. 6. The shank $a$ is formed with a recess $a'$ for the reception of the upper end $b'$ of the drill $b$.

To secure the drill $b$ to the shank $a$, the upper end $b'$ of the drill is inserted into the recess $a'$ of the shank, and locking keys or wedges $c$, such as illustrated in Figs. 4 and 5, are inserted or driven into the spaces formed in the recess $a'$ between the wall thereof and the end $b'$ of the drill $b$; the whole being then brazed together in any suitable manner. After this, the shank $a$, shown in Fig. 2, is turned or shaped to the form shown in Fig. 1.

I claim:

1. In a cutting or boring tool, the combination of a shank having a recessed end, a drill comprising a section of metal helically grooved on opposite sides and having its upper end inserted in the recess of said shank, said grooves extending continuously throughout the length of the drill, and separate wedging means disposed in said recessed shank between the wall thereof and the grooved portions at the upper end of said drill; said wedging means following the curvature of the helical grooves of the drill; and the shank, drill and wedging means being brazed together.

2. In a cutting or boring tool, the combination of a shank having a circularly recessed end, a drill proper or cutting part comprising a section of metal helically grooved on opposite sides and having its upper end inserted in the recess of said shank, said grooves extending continuously throughout the length of the drill and providing a plurality of sector-shaped spaces between it and the wall of the recess when inserted therein, and locking keys or wedges filling the spaces between said drill and the walls of the recess, said shank, drill and wedges being brazed together.

In testimony whereof, I have signed my name to this specification in the presence of two subscribing witnesses.

ISAAC BEST.

Witnesses:
HAROLD WALKER,
ARTHUR PERKINS.

Copies of this patent may be obtained for five cents each, by addressing the "Commissioner of Patents, Washington, D. C."